United States Patent
Hoffmann et al.

(10) Patent No.: US 8,951,604 B2
(45) Date of Patent: Feb. 10, 2015

(54) SURFACE TREATMENT OF CEMENTITIOUS SUBSTRATES

(75) Inventors: Armin Hoffmann, Neuoetting (DE); Juergen Bezler, Burghausen (DE); Stefan Bonimeier, Garching (DE)

(73) Assignee: Wacker Chemie AG, Munich (DE)

( * ) Notice: Subject to any disclaimer, the term of this patent is extended or adjusted under 35 U.S.C. 154(b) by 127 days.

(21) Appl. No.: 13/640,947

(22) PCT Filed: Apr. 6, 2011

(86) PCT No.: PCT/EP2011/055298
§ 371 (c)(1),
(2), (4) Date: Oct. 12, 2012

(87) PCT Pub. No.: WO2011/128232
PCT Pub. Date: Oct. 20, 2011

(65) Prior Publication Data
US 2013/0029142 A1   Jan. 31, 2013

(30) Foreign Application Priority Data

Apr. 13, 2010   (DE) .......................... 10 2010 003 919

(51) Int. Cl.
*B05C 1/16* (2006.01)
*B05D 5/10* (2006.01)
*E01C 5/00* (2006.01)
*E01C 11/24* (2006.01)
*E01C 17/00* (2006.01)
*C09D 1/08* (2006.01)
*C04B 24/26* (2006.01)
*C04B 28/02* (2006.01)
*C04B 103/00* (2006.01)
*C04B 111/00* (2006.01)
*C04B 111/60* (2006.01)

(52) U.S. Cl.
CPC .............. *C09D 1/08* (2013.01); *C04B 24/2641* (2013.01); *C04B 28/02* (2013.01); *C04B 2103/0052* (2013.01); *C04B 2103/0057* (2013.01); *C04B 2103/0065* (2013.01); *C04B 2111/00482* (2013.01); *C04B 2111/60* (2013.01)
USPC ............. 427/136; 404/75; 427/201; 427/337; 427/340; 427/355; 427/372.2; 427/384; 427/385.5; 427/393.4; 427/393.6; 427/403

(58) Field of Classification Search
None
See application file for complete search history.

(56) References Cited

U.S. PATENT DOCUMENTS

| 4,859,751 A | 8/1989 | Schulze et al. | |
|---|---|---|---|
| 2002/0022688 A1* | 2/2002 | Tysak et al. | 524/558 |
| 2004/0134378 A1 | 7/2004 | Batdorf | |
| 2007/0173574 A1 | 7/2007 | Weitzel et al. | |
| 2008/0152813 A1* | 6/2008 | Bowe et al. | 427/340 |
| 2010/0034978 A1* | 2/2010 | Garuti et al. | 427/403 |

FOREIGN PATENT DOCUMENTS

| DE | 2111362 A1 | 9/1972 |
|---|---|---|
| DE | 60100076 T2 | 11/2003 |
| DE | 102007034865 A1 | 1/2009 |
| DE | 102008043988 A1 | 5/2010 |
| DE | 102009000537 A1 | 8/2010 |
| EP | 0149098 A2 | 12/1984 |
| EP | 0496682 A1 | 7/1992 |
| EP | 1151973 A1 | 11/2001 |
| EP | 1763553 | 12/2005 |
| JP | 59051957 A | 3/1984 |
| WO | 02088260 A1 | 11/2002 |
| WO | 02090428 A2 | 11/2002 |
| WO | 2005118684 A1 | 12/2005 |
| WO | 2006095346 A2 | 9/2006 |

OTHER PUBLICATIONS

English-language Abstract corresponding to EP 1 151 973.*
Flick, "Water-Soluble Resins: An Industrial Guide (Second Edition)", Noyes Publications, 1991, pp. vii-xiv and 74-84.
Fox, "Influence of diluent and copolymer composition on the glass temperature of copolymers", Bull. Am. Phys. Soc. 1,. (Session J.) 123 (1965).
Lee et al., "The Glass Transition Temperatures of Polymers", in Brandup et al., Eds, "Polymer Handbook", 2nd Ed, Wiley, Inc, New York, 1975, pp. III-139-III-191.
International Search Report for PCT/EP2011/055298 dated May 18, 2011.
English-language abstract corresponding to DE 211 362 A1, Sep. 21, 1972.
English-language abstract corresponding to JP 59051957, Mar. 26, 1984.
English-language abstract corresponding to EP 1 151 973 A1, Nov. 7, 2001.
English-language abstract corresponding to DE 10 2008 043 988 A1, May 27, 2010.
English-language abstract corresponding to DE 10 2009 000 537 A1, Aug. 5, 2010.
English-language abstract corresponding to DE 10 2007 034 865 A1, Jan. 29, 2009.
English-language abstract corresponding to EP 0 496 682 A1, Jul. 29, 1992.

* cited by examiner

*Primary Examiner* — Timothy Meeks
*Assistant Examiner* — Michael P Rodriguez
(74) *Attorney, Agent, or Firm* — Caesar, Rivise, Bernstein, Cohen & Pokotilow, Ltd.

(57) ABSTRACT

The invention provides for the use of dry building materials comprising one or more polymers in the form of water-redispersible powders, and optionally mineral binders, optionally fillers and optionally additives, for the surface treatment of cementitious substrates that are as yet not fully set.

16 Claims, No Drawings

SURFACE TREATMENT OF CEMENTITIOUS SUBSTRATES

BACKGROUND OF THE INVENTION

The invention relates to the use of dry building materials for the surface treatment of cementitious substrates, a process for the surface treatment of cementitious substrates and also the surface-treated cementitious substrates which can be obtained in this way.

Cementitious substrates can be obtained by coating substrates with aqueous compositions based on cement, fillers and optionally additives. Cementitious substrates are open-pored and require an after-treatment, for example sealing or coating with a nonporous layer, in order to improve their mechanical properties and to reduce their soiling tendency. DE-A 2111362 recommends coating of cured concrete with self-hardening, liquid coating compositions based on polymerizable organic compounds, hardeners and optionally further organic polymers for this purpose. JP 59051967 recommends the use of paste-like, aqueous compositions containing organic polymers and hydraulically setting binders for sealing walls. Processes for producing industrial floors, in which a concrete screed is coated with a paste-like coating composition composed of stoneware, a curable, epoxide-containing synthetic resin, a hardener and a fluidizing binder and a coating is obtained by curing, are known from DE-A 60100076. Finally, WO-A 2006/095346 describes the coating of surfaces with decorative protective layers based on polymer resins, colored particles and glass particles.

In the light of this background, it was an object of the invention to provide efficient measures for the surface treatment of cementitious substrates, which should lead to an improvement in the mechanical properties, in particular the abrasion resistance, and a reduction in the soiling tendency of the cementitious substrates, and in which no voluminous layer should be applied to the cementitious substrates if possible.

DESCRIPTION OF THE INVENTION

The object has surprisingly been achieved by surface treatment of cementitious substrates with dry building materials, where the dry building materials contain polymers in the form of water-redispersible powders and optionally further constituents. It is critical here that the cementitious substrates have not yet fully set during the surface treatment with the dry building materials. For the purposes of the present invention, dry building materials do not encompass liquid or paste-like compositions.

The invention provides for the use of dry building materials containing one or more polymers in the form of water-redispersible powders and optionally mineral binders, optionally fillers and optionally additives for the surface treatment of cementitious substrates which have not yet fully set.

Cementitious substrates which have not yet fully set can generally be obtained by applying cementitious compositions based on cement, fillers, water and optionally additives, with the proviso that the cementitious substrates have at least partially set but still contain residual water from the cementitious compositions. The concept of setting of cementitious compositions is known to those skilled in the art. The cementitious substrates used according to the invention have thus generally partially set but not yet fully set. The cementitious substrates which have not yet fully set can also be characterized as solidified but not yet fully cured or not completely dried. This state of the cementitious substrates which have not yet fully set can, for example, be reflected in that it is possible for persons to walk on the substrates without the persons sinking into the cementitious substrates. The surface of the cementitious substrates is usually not even appreciably deformed when walked on.

The duration of setting until cementitious substrates which have not yet fully set are obtained depends on the ambient temperature, the atmospheric humidity and the specific composition of the cementitious compositions, for example on the use of additives such as setting accelerators or setting retarders, and consequently cannot be meaningfully defined by precise periods of time for technical reasons.

The cementitious substrates which have not yet fully set can be characterized by means of a setting parameter according to which a body which has a base area of from 350 to 400 $cm^2$ and a height of 20 cm and also a mass of 60 kg sinks into the cementitious substrate by from 0 to 5 mm, preferably from 0.1 to 3 mm and particularly preferably from 1 to 2 mm, 30 seconds after it has been placed with its base area downward on a cementitious substrate which has not yet fully set, under standard conditions in accordance with DIN50014.

Polymers used are generally polymers of one or more ethylenically unsaturated monomers. Preferred ethylenically unsaturated monomers are selected from the group consisting of vinyl esters, (meth)acrylic esters, vinylaromatics, olefins, 1,3-dienes and vinyl halides and optionally further monomers which can be copolymerized therewith.

Suitable vinyl esters are, for example, those of carboxylic acids having from 1 to 15 carbon atoms. Preference is given to vinyl acetate, vinyl propionate, vinyl butyrate, vinyl-2-ethylhexanoate, vinyl laurate, 1-methylvinyl acetate, vinyl pivalate and vinyl esters of α-branched monocarboxylic acids having from 9 to 11 carbon atoms, for example VeoVa9® or VeoVa10® (trade names of the company Resolution). Particular preference is given to vinyl acetate.

Suitable monomers from the group consisting of acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

As vinylaromatics, preference is given to styrene, methylstyrene and vinyltoluene. A preferred vinyl halide is vinyl chloride. The preferred olefins are ethylene, propylene and the preferred dienes are 1,3-butadiene and isoprene.

From 0 to 10% by weight, based on the total weight of the monomer mixture, of auxiliary monomers can optionally be copolymerized. Preference is given to using from 0.1 to 5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride; ethylenically unsaturated sulfonic acids and salts thereof, preferably vinylsulfonic acid, 2-acrylamido-2-methyl-propanesulfonic acid. Further examples are precrosslinking comonomers such as multiply ethylenically unsaturated comonomers, for example diallyl phthalate, divinyl adipate, diallyl maleate, allyl methacrylate or triallyl cyanurate, or postcrosslinking comonomers, for example acrylamido-glycolic acid (AGA), methyl methacrylamidoglycolate (MMAG), N-methylolacrylamide (NMA), N-methylol-methacrylamide, N-methylol(allyl carbamate), alkyl ethers such as the isobutoxy ether or esters of N-methylolacrylamide, of N-methylolmethacrylamide and of N-methylol(allyl carbamate). Epoxide-functional comonomers such as glycidyl methacrylate and glycidyl acrylate are also suitable. Further examples are silicon-functional comonomers such as acryloyloxypropyltri(alkoxy)silanes and methacryloyloxypropyltri(alkoxy)silanes, vinyltrialkoxysilanes and vinylmethyldialkoxysilanes, where, for example, ethoxy and ethoxypropylene glycol ether radicals can be present as alkoxy groups. Mention may also be made of monomers having hydroxy or CO groups, for example hydroxyalkyl esters of methacrylic acid and acrylic acid, e.g. hydroxyethyl, hydroxypropyl or hydroxybutyl acrylate or methacrylate, and also compounds such as diacetoneacrylamide and acetyl-acetoxyethyl acrylate or methacrylate.

Preference is given to one or more polymers selected from the group consisting of vinyl ester homopolymers, vinyl ester copolymers containing one or more monomer units from the group consisting of vinyl esters, olefins, vinylaromatics, vinyl halides, acrylic esters, methacrylic esters, fumaric and/or maleic monoesters or diesters; (meth)acrylic ester homopolymers, (meth)acrylic ester copolymers containing one or more monomer units from the group consisting of methacrylic esters, acrylic esters, olefins, vinylaromatics, vinyl halides, fumaric and/or maleic monoesters or diesters; homopolymers or copolymers of dienes such as butadiene or isoprene and also of olefins such as ethene or propene, where the dienes can, for example, be copolymerized with styrene, (meth) acrylic esters or the esters of fumaric or maleic acid; homopolymers or copolymers of vinylaromatics such as styrene, methyl-styrene, vinyltoluene; homopolymers or copolymers of vinyl halogen compounds such as vinyl chloride.

Particular preference is given to copolymers of one or more vinyl esters with from 1 to 50% by weight of ethylene; copolymers of vinyl acetate with from 1 to 50% by weight of ethylene and from 1 to 50% by weight of one or more further comonomers from the group consisting of vinyl esters having from 1 to 12 carbon atoms in the carboxylic acid radical, e.g. vinyl propionate, vinyl laurate, vinyl esters of alpha-branched carboxylic acids having from 9 to 13 carbon atoms, e.g. VeoVa9, VeoVa10, VeoVa11; copolymers of one or more vinyl esters, from 1 to 50% by weight of ethylene and preferably from 1 to 60% by weight of (meth)acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an alpha-branched carboxylic acid having from 9 to 11 carbon atoms, and also from 1 to 30% by weight of (meth)acrylic esters of unbranched or branched alcohols having from 1 to 15 carbon atoms, in particular n-butyl acrylate or 2-ethylhexyl acrylate, which additionally contain from 1 to 40% by weight of ethylene; copolymers comprising one or more vinyl esters, from 1 to 50% by weight of ethylene and from 1 to 60% by weight of vinyl chloride; where the polymers can additionally contain the abovementioned auxiliary monomers in the stated amounts and the figures in % by weight in each case add up to 100% by weight.

Particular preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group consisting of methyl acrylate, ethyl acrylate, propyl acrylate, n-butyl acrylate, 2-ethylhexyl acrylate; vinyl acetate-acrylic ester copolymers with one or more monomers from the group consisting of methyl acrylate, ethyl acrylate, propyl acrylate, n-butyl acrylate, 2-ethylhexyl acrylate and optionally ethylene; styrene-1,3-butadiene copolymers; where the polymers can additionally contain the abovementioned auxiliary monomers in the stated amounts and the figures in % by weight in each case add up to 100% by weight.

Examples of particularly preferred comonomers for vinyl chloride copolymers are α-olefins such as ethylene, propylene and/or vinyl esters such as vinyl acetate and/or acrylic esters or methacrylic esters of alcohols having from 1 to 15 carbon atoms, e.g. methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate, and/or fumaric and/or maleic monoesters or diesters such as the dimethyl, methyl t-butyl, di-n-butyl, di-t-butyl and diethyl esters of maleic acid or fumaric acid.

The greatest preference is given to copolymers comprising vinyl acetate and from 5 to 50% by weight of ethylene; or copolymers comprising vinyl acetate, from 1 to 50% by weight of ethylene and from 1 to 50% by weight of a vinyl ester of α-branched monocarboxylic acids having from 9 to 11 carbon atoms; or copolymers comprising from 30 to 75% by weight of vinyl acetate, from 1 to 30% by weight of vinyl laurate or vinyl esters of an alpha-branched carboxylic acid having from 9 to 11 carbon atoms and also from 1 to 30% by weight of (meth)acrylic esters of unbranched or branched alcohols having from 1 to 15 carbon atoms, which additionally contain from 1 to 40% by weight of ethylene; or copolymers comprising vinyl acetate, from 5 to 50% by weight of ethylene and from 1 to 60% by weight of vinyl chloride.

Most preferred copolymers also include vinyl chloride-ethylene copolymers containing from 60 to 99% by weight of vinyl chloride units and from 1 to 40% by weight of ethylene units, where the figures in % by weight are based on the total weight of the copolymer and in each case add to 100% by weight. Such vinyl chloride-ethylene copolymers are known from EP 0 149 098 A2.

The selection of monomers and the selection of the proportions by weight of the comonomers is carried out so as to result in a glass transition temperature Tg of from −50° C. to +50° C., preferably from −25° C. to +25° C., particularly preferably from −20° C. to +10° C. The glass transition temperature Tg of the polymers can be determined in a known way by means of differential scanning calorimetry (DSC). The Tg can also be calculated approximately beforehand by means of the Fox equation. According to Fox T. G., Bull. Am. Physics Soc. 1, 3 page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in kelvin of the homopolymer of the monomer n. Tg values for homopolymers are given in Polymer Handbook 2nd Edition, J. Wiley & Sons, New York (1975).

The preparation of the polymers is carried out in an aqueous medium and preferably by the emulsion polymerization or suspension polymerization process as described, for example, in DE-A 102008043988. The polymers are obtained in the form of aqueous dispersions. The customary protective colloids and/or emulsifiers as described in DE-A 102008043988 can be used in the polymerization. The protective colloids can be anionic or preferably cationic or nonionic. Combinations of cationic and nonionic protective colloids are also preferred. Preferred nonionic protective colloids are polyvinyl alcohols. Preferred cationic protective colloids are polymers which bear one or more cationic charges, as described, for example, in E. W. Flick, Water Soluble Resins—an Industrial Guide, Noyes Publications, Park Ridge, N.J., 1991. Partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 94 mol % and a Höppler viscosity in 4% aqueous solution of from 1 to 30 mPas (method of Höppler at 20° C., DIN 53015) are preferred as protective colloids. The protective colloids mentioned are available by means of processes known to those skilled in the art and are generally added in a total amount of from 1 to 20% by weight, based on the total weight of the monomers, in the polymerization.

The polymers in the form of aqueous dispersions can be converted into corresponding water-redispersible powders as described in DE-A 102008043988. Here, a drying aid is generally used in a total amount of from 3 to 30% by weight, preferably from 5 to 20% by weight, based on the polymeric constituents of the dispersion. The abovementioned polyvinyl alcohols are preferred as drying aid.

It is also possible to use one or more hydrophobic polymer compositions in the form of water-redispersible powders as polymers.

Preferred hydrophobic polymer compositions in the form of water-redispersible powders contain
a) one or more of the abovementioned polymers in the form of water-redispersible powders and
b) one or more organosilicon compounds or
c) one or more fatty acids and/or fatty acid derivatives, or a combination of the components a), b) and c).

Preferred organosilicon compounds b) are silicic esters $Si(OR')_4$, silanes such as tetraorganosilanes $SiR_4$ and organoorganoxysilanes $SiR_n(OR')_{4-n}$, where n=1 to 3, polysilanes which preferably have the general formula $R_3Si(SiR_2)_nSiR_3$ where n=0 to 500, organosilanols $SiR_n(OH)_{4-n}$, disiloxanes, oligosiloxanes, polysiloxanes composed of units of the general formula $R_cH_dSi(OR')_e(OH)_fO_{(4-c-d-e-f)/2}$ where c=0 to 3, d=0 to 1, e=0 to 3, f=0 to 3 and the sum of c+d+e+f of each unit is not more than 3.5, where the radicals R are in each case identical or different and are branched or unbranched alkyl radicals having from 1 to 22 carbon atoms, cycloalkyl radicals having from 3 to 10 carbon atoms, alkylene radicals having from 2 to 4 carbon atoms and also aryl, aralkyl, alkylaryl radicals having from 6 to 18 carbon atoms and R' are identical or different alkyl radicals and alkoxyalkylene radicals each having from 1 to 4 carbon atoms, preferably methyl and ethyl, where the radicals R and R' may also be substituted by halogens such as chlorine, by ether, thioether, ester, amide, nitrile, hydroxyl, amine, carboxyl, sulfonic acid, carboxylic anhydride and carbonyl groups and in the case of the polysilanes R can also be OR'.

Preferred organosilicon compounds b) also include carbosilanes, polycarbosilanes, carbosiloxanes, polycarbosiloxanes or polysilylenedisiloxanes and also cyclosiloxanes.

Particularly preferred organosilicon compounds b) are tetramethoxysilane, tetraethoxylsilane, methyl-tripropoxysilane, methyltri(ethoxyethoxy)silane, vinytri(methoxyethoxy)silane, (meth)acryloyloxypropyl-trimethoxysilane, (meth)acryloyloxypropyl-triethoxysilane, γ-chloropropyltriethoxysilane, β-nitriloethyltriethoxysilane, γ-mercaptopropyltrimethoxysilane γ-mercaptopropyl-triethoxysilane, phenyltriethoxysilane, isooctyl-triethoxysilane, n-octyltriethoxysilane, hexadecyl-triethoxysilane, dipropyldiethoxysilane, methylphenyl-diethoxysilane, diphenyldimethoxysilane, methylvinyl-tri(ethoxyethoxy)silane, tetramethyldiethoxysilane, trimethyltrimethoxydisilane, trimethyltriethoxy-disilane, dimethyltetramethoxydisilane, dimethyltetra-ethoxydisilane, methylhydrogenpolysiloxanes which are end-blocked by trimethylsiloxy groups, copolymers which are made up of dimethylsiloxane and methyl-hydrogensiloxane units and are end-blocked by trimethylsiloxy groups, dimethylpolysiloxanes and also dimethylpolysiloxanes having Si—OH groups in the terminal units.

Preferred fatty acids or fatty acid derivatives c) are selected from the group consisting of saturated and unsaturated fatty acids having from 8 to 22 carbon atoms, their metal soaps, their amides and their esters with monohydric alcohols having from 1 to 14 carbon atoms, with glycol, with polyglycol, with polyalkylene glycol, with glycerol, with monoethanolamine, diethanolamine or triethanolamine, with monosaccharides and with polyhydroxy compounds.

Particularly preferred fatty acids are n-dodecanoic acid, n-tetradecanoic acid, n-hexadecanoic acid, n-octadecanoic acid and 9-dodecenoic acid. Particularly preferred metal soaps are those of the preferred $C_8$-$C_{22}$-fatty acids with metals of main groups 1 to 3, in particular lithium, sodium, potassium, magnesium, calcium or aluminum, or transition group 2 of the PTE, in particular zinc, and also with ammonium compounds. Particularly preferred fatty acid amides are the fatty acid amides which can be obtained from monoethanolamine or diethanolamine and the abovementioned $C_8$-$C_{22}$-fatty acids. Particularly preferred fatty acid esters are the $C_1$-$C_{14}$-alkyl esters and -alkylaryl esters of the abovementioned $C_8$-$C_{22}$-fatty acids, preferably methyl, ethyl, propyl, butyl, ethylhexyl esters and also the benzyl esters. Particularly preferred fatty acid esters are the monoglycol, diglycol and polyglycol esters of the $C_8$-$C_{22}$-fatty acids. Further particularly preferred fatty acid esters are the monoesters and diesters of polyglycols and/or polyalkylene glycols having up to 20 oxyalkylene units, e.g. polyethylene glycol and polypropylene glycol. The monofatty acid, difatty acid and trifatty acid esters of glycerol with the abovementioned $C_8$-$C_{22}$-fatty acids and the monofatty acid, difatty acid and trifatty acid esters of monoethanolamine, diethanolamine and triethanolamine with the abovementioned $C_8$-$C_{22}$-fatty acids are also particularly preferred. The fatty acid esters of sorbitol and mannitol are also particularly preferred. Greatest preference is given to the $C_1$-$C_{14}$-alkyl esters and alkylaryl esters of lauric acid and of oleic acid, monoglycol and diglycol esters of lauric acid and of oleic acid and also the monofatty acid, difatty acid and trifatty acid esters of glycerol with lauric acid and with oleic acid.

The proportion of the organosilicon compounds b) or the proportion of the fatty acids or fatty acid derivatives c) and also the proportion of mixtures of b) and c) is in each case preferably from 0.1 to 30% by weight, particularly preferably from 1 to 20% by weight and most preferably from 1 to 10% by weight, where the figures in % by weight are each based on the total weight of polymer a).

The production of hydrophobic polymer compositions in the form of water-redispersible powders is known to those skilled in the art and is described, for example, in EP-A 1763553.

The use of mixtures of at least two polymers, at least two hydrophobic polymer compositions or one or more polymers with one or more hydrophobic polymer compositions is also preferred. Preferred mixtures contain one or more homopolymers or copolymers of vinyl esters and one or more homopolymers or copolymers of vinyl halides, in particular in a ratio of from 2:1 to 1:2.

As polymers in the form of water-redispersible powders, preference is also given to using one or more crosslinkable, water-redispersible polymer powder compositions. Crosslinkable, water-redispersible polymer powder compositions can be obtained by adding one or more epoxy resins before and/or during the polymerization of the abovementioned monomers for preparing the polymers and/or before drying of the resulting polymer dispersion and optionally adding one or more hardeners which crosslink with the epoxy resin after drying. The production of crosslinkable, water-redispersible polymer powder compositions is known, for example, from DE-A 102009000537. The crosslinkable polymer powder compositions preferably contain less than 5% by weight of polymers containing ethylenically unsaturated groups.

For the purposes of the present invention, the term epoxy resin refers to epoxide compounds which have at least two epoxide groups per molecule and are preferably not free-radically polymerizable. The epoxide compounds can be aliphatic, araliphatic or aromatic in nature. Examples are epoxide compounds of the bisphenol A type, i.e. condensation products of bisphenol A and epichlorohydrin or methylepichlorohydrin. Epoxy resins based on bisphenol F, which generally contain a mixture of bisglycidyloxyphenylmethanes, are also suitable. Further examples are aliphatic epoxide compounds such as glycidyl ethers of aliphatic polyols, in particular butyl diglycidyl ether; cycloaliphatic epoxy resins such as vinylcyclohexane dioxide an dicyclopentadiene dioxide; and heterocyclic epoxide compounds such as triglycidyl isocyanurate. Such epoxy resins are commercially available, for example the bisphenol A and bisphenol F types as Epilox® resins. Preference is given to the epoxy resins of the bisphenol A type and the bisphenol F type.

The epoxy resins are used in an amount of from 1 to 50% by weight, preferably from 5 to 30% by weight, in each case based on the total weight of the polymers.

Suitable hardeners which crosslink with the epoxy resin are, in particular, those which crosslink with the epoxy resin at the processing temperature of building chemical products, i.e. normally at ambient temperature, generally at temperatures in the range from 0° C. to 40° C. Preference is given to amines which crosslink with the epoxy resin. Preferred amines are those having two or more amino groups, for example aliphatic polyamines, polyoxyalkyleneamines, polyethyleneimines, aminosilanes and condensation products thereof, amino-functional polyvinyl alcohols. Particular preference is given to aliphatic polyamines which can be obtained under the trade names Anquamine® or Epilink® or Epilox® hardeners, or polyoxyalkylene-amines which can be obtained under the trade names Jeffamine® or polyethyleneimines which can be obtained under the trade name Polyimin. Particular preference is also given to aminosilanes and condensation products thereof. Suitable aminosilanes are, for example, those which can be obtained under the trade name Geniosil®, e.g. N-(2-aminoethyl)(3-aminopropyl)trimethoxysilane (Geniosil GF 91), (3-aminopropyl)triethoxysilane (Geniosil GF 93), N-(2-aminoethyl)(3-aminopropyl)-methyldimethoxysilane (Geniosil GF 95).

The amount used of the hardener which crosslinks with the epoxy resin depends on the molar ratio of the epoxide groups to the functional groups of the hardener, for example amino groups, in the polymer powder composition. In general, the epoxide-containing powders and the hardeners are used in such a ratio that the molar ratio of epoxide groups to the functional groups of the hardener is from 0.5 to 2.0.

Suitable mineral binders are, for example, cement, in particular portland cement, aluminate cement, in particular calcium sulfoaluminate cement, trass cement, slag cement, magnesia cement, phosphate cement or blast furnace cement, and also mixed cements, filling cements, fly ash, microsilica, slag sand, hydrated lime, white hydrated lime, calcium oxide (unslaked lime) and gypsum plaster. Preference is given to portland cement, aluminate cement and slag cement and also mixed cements, filling cements, hydrated lime, white hydrated lime and gypsum plaster.

Examples of suitable fillers are silica sand, quartz flour, ground limestone, calcium carbonate, dolomite, clay, chalk, white hydrated lime, talc or mica, granulated rubber or hard fillers such as aluminum silicates, α-alumina, basalt, carbides such as silicon carbide or titanium carbide, or pozzolanic fillers such as fly ash, metakaolin, microsilica. It is also possible to use any mixtures of the abovementioned fillers.

Preferred fillers are silica sand, quartz flour, ground limestone, calcium carbonate, calcium magnesium carbonate (dolomite), chalk or white hydrated lime, preferably in combination with hard fillers and/or pozzolanic fillers. Particular preference is given to ground limestone, silica sand, quartz flour, preferably in combination with hard fillers and/or pozzolanic fillers. Hard fillers increase the surface resistance and wear resistance of the surface-treated cementitious substrates. Pozzolanic fillers increase the impermeability and thus strength of the surface-treated cementitious substrates.

The fillers preferably have an average particle diameter of from 0.01 to 5 mm, preferably from 0.05 to 3 mm and particularly preferably from 0.1 to 2 mm. Hard fillers are preferably used in amounts of from 0 to 100% by weight and particularly preferably from 10 to 80% by weight and most preferably from 40 to 50% by weight, based on the total amount of fillers. Pozzolanic fillers are preferably used amounts of from 0 to 30% by weight and particularly preferably from 5 to 15% by weight, in each case based on the total amount of fillers.

Typical formulations for the dry building materials preferably contain from 0.1 to 100% by weight, particularly preferably from 0.1 to 20% by weight, very particularly preferably from 0.5 to 10% by weight and most preferably from 1 to 6% by weight, of polymers in the form of water-redispersible powders; from 0 to 70% by weight, preferably from 10 to 50% by weight and most preferably from 20 to 40% by weight of mineral binders; from 0 to 90% by weight, preferably from 20 to 80% by weight and particularly preferably from 50 to 80% by weight, of fillers; where the figures in % by weight are based on the dry weight of the dry building materials and together add up to 100% by weight.

The use properties of the dry building materials can be improved by means of additives. Customary additives for dry building materials are thickeners, for example polysaccharides such as cellulose ethers and modified cellulose ethers, starch ethers, guar gum, xanthan gum, sheet silicates, polycarboxylic acids such as polyacrylic acid and partial esters thereof and also polyvinyl alcohols which may optionally be acetalized or hydrophobically modified, casein and associative thickeners. Customary additives also include retarders such as hydroxycarboxylic acids or dicarboxylic acids or salts thereof, saccharides, oxalic acid, succinic acid, tartaric acid, gluconic acid, citric acid, sucrose, glucose, fructose, sorbitol, pentaerythritol. Customary additives also include crosslinkers such as metal oxides or semimetal oxides, in particular boric acid or polyborates, or dialdehydes such as glutaric dialdehyde; other customary additives are setting accelerators, for example alkali metal or alkaline earth metal salts of inorganic or organic acids. Further additives are pigments, for example titanium oxide as inorganic pigment, or conventional organic pigments. Mention may also be made of: preservatives, film formers, dispersants, foam stabilizers, antifoams, plasticizers, leveling agents and flame retardants (e.g. aluminum hydroxide).

In general, the total proportion of additives in the dry building materials is from 0 to 20% by weight, preferably from 0.1 to 15% by weight and particularly preferably from 0.1 to 10% by weight, in each case based on the dry weight of the dry building materials. The production of the dry building materials containing one or more polymers and optionally one or more components from the group consisting of mineral binders, fillers and additives is not tied to any particular procedure or mixing apparatus. Dry building materials can be obtained by mixing and homogenizing the individual constituents of the formulation in conventional powder mixing apparatuses. The individual constituents are generally used in dry form for mixing.

The invention further provides processes for the surface treatment of cementitious substrates, in which
a) cementitious compositions based on cement, fillers, water and optionally polymers and optionally additives are applied, characterized in that
b) the dry building materials used according to the invention are applied to the surface of the cementitious substrates from step a) after the cementitious compositions have at least partially solidified but before the cementitious compositions have fully set.

The invention further provides surface-treated cementitious substrates which can be obtained by application of
a) cementitious compositions based on cement, fillers, water and optionally polymers and optionally additives, characterized in that
b) the dry building materials used according to the invention are applied to the surface of the cementitious substrates from step a) after the cementitious compositions have at least partially solidified but before the cementitious compositions have fully set.

Examples of cementitious substrates are concrete or screeds. The substrates can be floors, walls, ceilings or other surfaces. In step a), it is possible to use the abovementioned components in the abovementioned amounts as cement, fillers, polymers and additives and additionally from 5 to 50% by weight of water, based on the dry components of the cementitious compositions. The fillers in the cementitious compositions can also be gravel or crushed material.

Before carrying out step b), it may be necessary to correct the water content of the cementitious substrates. The cementitious substrate preferably still contains such an amount of water that there is just no supernatant water on the surface of the cementitious substrate. Supernatant water can, for example, be removed mechanically, for example wiped off, or by means of suction. If necessary, water can also be added, for example sprinkled or sprayed on, if the cementitious substrate which has not yet fully set contains too little water.

The dry building materials can be applied by manual methods or by machine in step b). In the case of manual methods, the dry building materials are sprinkled onto the cementitious substrate by means of the bare hand or using auxiliary equipment such as cups or shovels. In the case of machine methods, the dry building materials are applied to the cementitious substrate by means of dry spraying machines or preferably by means of dry sprinkling machines. These methods are generally referred as scattering methods. It is possible to apply one or more, preferably at least two and particularly preferably two, layers of dry building materials on top of one another. The dry building materials are usually applied at ambient temperatures, i.e. generally at temperatures of from 2 to 50° C., in particular from 10 to 35° C.

Preference is given to applying from 1 to 20 kg, particularly preferably from 3 to 5 kg, of dry building material per square meter of a cementitious substrate. The applied thickness of the dry building materials on the cementitious substrates is preferably ≤10 mm and particularly preferably ≤3 mm.

In a step c) after application of dry building materials in step b), the surface of the surface-treated cementitious substrate is preferably smoothed or the dry building materials applied are massaged in. The uniformity of application and integration of the dry building materials into the cementitious substrates can be improved in this way. Smoothing can be effected, for example, by means of a hand trowel or power trowels. The application of dry building materials and smoothing can be carried out in a single operation when machine methods are used.

An after-treatment (step d)) is generally carried out after step b) or optionally after step c). For this purpose, a film, usually a polymer film such as polyvinyl chloride, in particular polyethylene or polypropylene, can be laid onto the surface of the surface-treated cementitious substrate. As an alternative, an aqueous dispersion of a polymer (polymer dispersion) can be sprayed on, for example a styrene-butadiene copolymer (SBR), polyvinylidene chloride copolymer (PVDC) or styrene-acrylate copolymer (SA). The solids content of the polymer dispersion is usually from 10 to 70%. Such polymer dispersions then form a membrane which is impermeable to water vapor, also known by the technical term curing membrane.

The after-treatment contributes to the surface-treated substrate becoming fully hydrated or fully set and the water not being given off prematurely. Premature drying can reduce the surface strengths of the cementitious substrate and even lead to detachment of the uppermost layer of the cementitious substrate.

After conclusion of the process of the invention and after complete curing or complete setting of the cementitious substrates, the dry building materials are essentially integrated into the cementitious substrates; i.e. the dry building materials generally do not form an independent layer on the fully set cementitious substrates; or the layer thickness of the fully set cementitious substrates is generally not influenced by step b) of the process of the invention. Without being tied to a theory, it is assumed that the constituents of the dry building materials are present in an increased concentration in the region of the surface of the cementitious substrates and the surface properties of the cementitious substrates are improved thereby. Addition of the constituents of the dry formulations to the cementitious compositions for producing the cementitious substrates does not lead to the products according to the invention.

The dry building materials can quite generally be used for producing resistant covering layers or as surface hardeners. The process of the invention can be used in interiors, overroof exterior regions or else exposed exterior regions. The surface-treated cementitious substrates can, for example, be floors of any type, e.g. industrial floors, in particular floors in factories, depots, storage facilities or laboratories, floors of public buildings, in particular floors in hospitals, schools or shopping centers, garage floors, in particular underground garages or parking decks, or generally floors of corridors.

The use according to the invention of the dry building materials surprisingly makes it possible to obtain surface-treated cementitious substrates having an improved mechanical property profile, in particular a higher abrasion resistance. At the same time, the cementitious substrates of the invention have a reduced soiling tendency, even with respect to oils or fats. Unexpectedly, the soiling tendency has been able to reduced by use of hydrophobically modified polymer compositions. As a result of the redispersibility of the polymers in water, the polymers are redispersed during the process of the invention and the polymers are distributed advantageously in the surface region of the cementitious substrates, so that the pores in the cementitious substrates are closed in an efficient way. In contrast, the corresponding use of polymers which are not redispersible in water results predominantly in film formation at the surface of the cementitious substrates, so that the effects according to the invention do not occur or occur far less efficiently. When aqueous or liquid formulations are used for the surface treatment, the advantageous effects achieved according to the invention are also not obtained.

The following examples serve to illustrate the invention in detail and are not to be interpreted as any form of restriction.

Production of the Test Specimens:

To produce cementitious compositions, a formulation based on the following constituents was used:

99% by weight of screed concrete B25 conforming to DIN 1045

1% by weight of setting accelerator and 9.5% by weight of water, based on the dry mass of the constituents of the formulation.

Mixing of the components of the abovementioned formulation in a laboratory mixer gave a cementitious composition. The cementitious composition was poured into a mold having a base area of 50 cm×50 cm and a height of 5 cm and compacted by shaking a number of times on a vibrating table and subsequently smoothed. The ability of to be walked on required according to the invention or the degree of setting or setting parameter according to the invention of the respective cementitious substrate was achieved after storage for 2 hours under standard conditions in accordance with DIN50014.

For the surface treatment of the cementitious substrates, dry formulations based on the following constituents were used:

| | |
|---|---|
| Cement CEM I 52,5 R: | 300 parts by weight |
| Microsilica 955 U | 50 parts by weight |
| Basalt 0-2 | 300 parts by weight |
| Silica sand F31 | 200 parts by weight |
| Silica sand AKW HR0,7-1,2T (No. 5) | 150 parts by weight | and optionally a water-redispersible polymer powder as shown in table 1, where the figures in parts by weight are in each case based on the total weight of the respective dry formulation.

The respective dry formulation was uniformly sprinkled manually in an amount of 4 kg/cm$^2$ onto the respective cementitious substrate. The respective dry formulation was wetted by absorption of residual water present in the cementitious substrate. The surface of the substrate which had been treated in this way was smoothed by means of a spatula and covered with a polyethylene film and subsequently stored for 3 days under standard conditions in accordance with DIN50014.

In this way, (comparative) test specimens ((C) specimen) 1 to 6 corresponding to (comparative) examples ((C) ex.) 1 to 6 were obtained using the respective dry formulation.

TABLE 1

Polymers used in the dry formulations:

| | C Ex. 1 | Ex. 2 | Ex. 3 | Ex. 4 | Ex. 5 | Ex. 6 |
|---|---|---|---|---|---|---|
| Polymer-1* [parts by weight] | 0 | 1 | 2 | 5 | 0 | 3 |
| Polymer-2** [parts by weight] | 0 | 0 | 0 | 0 | 5 | 2 |

*water-redispersible, polyvinyl alcohol-stabilized polymer powder based on vinyl acetate and ethylene having a glass transition temperature Tg of 16° C.;
**water-redispersible, polyvinyl alcohol-stabilized, hydrophobicized polymer powder based on vinyl chloride, vinyl laurate and ethylene.

Determination of the Abrasion Resistance of the Test Specimens:

The abrasion resistance of the respective test specimen was determined in accordance with EN 13892 part 5 ("Determination of wear resistance to rolling wheel of screeds for working surfaces"). The results are shown in table 2.

TABLE 2

Results of the testing of the abrasion resistance:

| | C Specimen 1 | Specimen 2 | Specimen 3 | Specimen 4 | Specimen 5 | Specimen 6 |
|---|---|---|---|---|---|---|
| Abrasion cycles | 2930 | 2930 | 2936 | 10000 | 2930 | 10000 |
| Abraded amount [g] | 14.4 | 14.2 | 4.1 | 2.8* | 10.4 | 3.9 |

It can be seen from the testing of comparative test specimen 1 and test specimens 2, 3 and 5 that the abrasion is reduced by the procedure according to the invention (table 2: C specimen 1 and specimens 2, 3 and 5). An increase in the polymer content of the dry formulation leads to a reduction in the abraded amount, even when the number of abrasion cycles, i.e. the abrasion stress, is increased (table 2: specimen 2 and specimen 4). The use of hydrophobicized polymer powders also leads to a reduction in the abraded amount (table 2: C specimen 1 and specimen 5). The abrasion is reduced further by joint use of hydrophobicized and unhydrophobicized polymer powders (table 2: specimen 5 and specimen 6).

Determination of the Soiling Tendency of the Test Specimens:

A spot of each of ketchup, mustard, oil and balsamic vinegar was applied to the respective test specimens. After storage for 24 hours under standard conditions in accordance with DIN50014, the surface of the respective test specimen which had been treated in this way was rinsed with water and, after drying, the degree of soiling of the surface of the respective test specimen was assessed visually according to the following system of school-type grades (table 3):

1=no soiling residue is discernible;

2=in the case of one or two substances, slight traces of soiling residue are discernible;

3=in the case of three of four substances, slight traces of soiling residue are discernible;

4=soiling residues of all four substances readily discernible on the surface;

5=all four substances applied have penetrated very substantially into the test specimens; soiling residues of all four substances are very clear on the surface of the test specimen.

TABLE 3

| Results of soiling tendency: | | | | | | |
|---|---|---|---|---|---|---|
| | C Specimen 1 | Specimen 2 | Specimen 3 | Specimen 4 | Specimen 5 | Specimen 6 |
| Degree of soiling | 5 | 4 | 4 | 3 | 2 | 3 |

It can be seen from table 3 that the soiling tendency of the test specimens is reduced by the procedure according to the invention and particularly when using hydrophobicized polymer powders.

The invention claimed is:

1. A method for surface treatment of cementitious substrates using dry building materials, said method comprising:
providing dry building materials comprising one or more polymers in a form of water-redispersible powders, wherein the polymers are based on one or more ethylenically unsaturated monomers, and optionally mineral binders, optionally fillers and optionally additives,
applying the dry building materials to a surface of cementitious substrates which have not yet fully set,
wherein the cementitious substrates which have not yet fully set are characterized by a setting parameter according to which a body which has a base area of from 350 to 400 cm$^2$ and a height of 20 cm and also a mass of 60 kg sinks into the cementitious substrate from 0.1 to 5 mm, 30 seconds after the body has been placed base area downward on a cementitious substrate which has not yet fully set, under standard conditions in accordance with DIN50014.

2. The method as claimed in claim 1, wherein the polymers are one or more ethylenically unsaturated monomers selected from the group consisting of vinyl esters, (meth)acrylic esters, vinylaromatics, olefins, 1,3-dienes and vinyl halides.

3. The method as claimed in claim 1, wherein the polymers are one or more hydrophobic polymer compositions.

4. The method as claimed in claim 1, wherein the polymers are at least two polymers or at least two hydrophobic polymer compositions or one or more polymers and one or more hydrophobic polymer compositions.

5. The method as claimed in claim 1, wherein the fillers are selected from the group consisting of silica sand, quartz flour, ground limestone, calcium carbonate, dolomite, clay, chalk, white hydrated lime, talc, mica and granulated rubber and are optionally used in combination with hard fillers and/or pozzolanic fillers.

6. The method as claimed in claim 1, wherein the dry building materials comprise from 0.1 to 100% by weight of the polymers in the form of water-redispersible powders, from 0 to 70% by weight of the mineral binders, from 0 to 90% by weight of the fillers, where the figures in % by weight are based on a dry weight of the dry building materials and together add up to 100% by weight.

7. A process for the surface treatment of a cementitious substrate, comprising
a) providing the cementitious substrate comprising cement, fillers, water and optionally polymers and optionally additives;
b) applying to a surface of the cementitious substrate dry building materials comprising one or more polymers in a form of water-redispersible powders, wherein the one or more polymers are based on one or more ethylenically unsaturated monomers, and optionally mineral binders, optionally fillers and optionally additives, said dry building materials being applied to the surface of the cementitious substrate after the cementitious substrate has at least partially solidified but before the cementitious substrate has fully set so that the cementitious substrate is characterized by a setting parameter according to which a body which has a base area of from 350 to 400 cm$^2$ and a height of 20 cm and also a mass of 60 kg sinks into the cementitious substrate from 0.1 to 5 mm, 30 seconds after the body has been placed base area downward on a cementitious substrate which has not yet fully set, under standard conditions in accordance with DIN50014, and then optionally
c) the surface of the surface-treated cementitious substrate is smoothed and/or the dry building materials applied are massaged in and optionally
d) one or more films are laid onto the surface-treated cementitious substrate or one or more aqueous dispersions of polymers are sprayed on.

8. The process as claimed in claim 7, wherein an applied thickness of the dry building materials on the cementitious substrate in step b) is ≤10 mm.

9. The process as claimed in claim 7, wherein the surface of the surface-treated cementitious substrate is smoothed and/or the dry building materials applied are massaged in after step b).

10. The process as claimed in claim 9, wherein one or more films are laid onto the surface-treated cementitious substrate or one or more aqueous dispersions of polymers are sprayed on.

11. The process as claimed in claim 7, wherein the one or more polymers based on one or more ethylenically unsaturated monomers are selected from the group consisting of vinyl esters, (meth)acrylic esters, vinylaromatics, olefins, 1,3-dienes and vinyl halides.

12. The process as claimed in claim 7, wherein the one or more polymers are one or more hydrophobic polymer compositions.

13. The process as claimed in claim 7, wherein the one or more polymers are at least two polymers or at least two hydrophobic polymer compositions or one or more polymers and one or more hydrophobic polymer compositions.

14. The process as claimed in claim 7, wherein the fillers are selected from the group consisting of silica sand, quartz flour, ground limestone, calcium carbonate, dolomite, clay, chalk, white hydrated lime, talc, mica and granulated rubber and are optionally used in combination with hard fillers and/or pozzolanic fillers.

15. The process as claimed in claim 7, wherein the dry building materials contain from 0.1 to 100% by weight of the one or more polymers in the form of water-redispersible powders, from 0 to 70% by weight of the mineral binders, from 0 to 90% by weight of the fillers, where the figures in % by weight are based on a dry weight of the dry building materials and together add up to 100% by weight.

16. The process as claimed in claim 1, wherein the polymers are based on one or more ethylenically unsaturated monomers selected from the group consisting of vinyl acetate, vinyl propionate, vinyl butyrate, vinyl-2-ethylhexanoate, vinyl laurate, 1-methylvinyl acetate, vinyl pivalate, vinyl esters of a-branched monocarboxylic acids having from 9 to 11 carbon atoms, methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate, styrene, methylstyrene, vinyltoluene, vinyl chloride, ethylene, propylene, 1,3-butadiene, isoprene, acrylic acid, methacrylic acid, fumaric acid, maleic acid, acrylamide, acrylonitrile, diethyl esters of fumaric acid, diisopropyl esters of fumaric acid, diethyl esters of maleic acid, diisopropyl esters of maleic acid, maleic anhydride, vinylsulfonic acid, 2-acrylamido-2-methyl-propanesulfonic acid, diallyl phthalate, divinyl adipate, diallyl maleate, allyl methacrylate, triallyl cyanurate, acrylamido-glycolic acid, methyl methacrylamidoglycolate, N-methylol-acrylamide, N-methylol-methacrylamide, N-methylol(allyl carbamate), isobutoxy ether of N-methylolacrylamide, isobutoxy ester of N-methylolacrylamide, isobutoxy ether of N-methylolmethacrylamide, isobutoxy ester of N-methylolmethacrylamide, isobutoxy ether of N-methylol(allyl carbamate), isobutoxy ester of N-methylol (allyl carbamate), glycidyl methacrylate, glycidyl acrylate, acryloyloxypropyl-tri(alkoxy)silanes, methacryloyloxy-propyl-tri(alkoxy)silanes, vinyl-trialkoxy-silanes, vinyl-methyl-dialkoxy-silanes, hydroxyethyl acrylate, hydroxypropyl acrylate, hydroxybutyl acrylate, hydroxyethyl methacrylate, hydroxypropyl methacrylate, hydroxybutyl methacrylate, diacetone-acrylamide, acetyl-acetoxy-ethyl acrylate and acetyl-acetoxy-ethyl methacrylate.

\* \* \* \* \*